United States Patent
Schiel

(10) Patent No.: US 8,876,223 B2
(45) Date of Patent: Nov. 4, 2014

(54) BRAKE SYSTEM FOR MOTOR VEHICLES

(75) Inventor: Lothar Schiel, Hofheim (DE)

(73) Assignee: Continental Teves AG & Co. oHG (DE)

( * ) Notice: Subject to any disclaimer, the term of this patent is extended or adjusted under 35 U.S.C. 154(b) by 124 days.

(21) Appl. No.: 13/583,279

(22) PCT Filed: Mar. 29, 2011

(86) PCT No.: PCT/EP2011/054815
§ 371 (c)(1),
(2), (4) Date: Sep. 7, 2012

(87) PCT Pub. No.: WO2011/120962
PCT Pub. Date: Oct. 6, 2011

(65) Prior Publication Data
US 2013/0049451 A1    Feb. 28, 2013

(30) Foreign Application Priority Data

Mar. 29, 2010   (DE) .......................... 10 2010 003 380
Apr. 7, 2010   (DE) .......................... 10 2010 003 689

(51) Int. Cl.
| | |
|---|---|
| *B60T 13/66* | (2006.01) |
| *B60T 7/04* | (2006.01) |
| *B60T 11/224* | (2006.01) |
| *B60T 8/40* | (2006.01) |
| *B60T 8/38* | (2006.01) |

(52) U.S. Cl.
CPC .............. *B60T 7/042* (2013.01); *B60T 11/224* (2013.01); *B60T 8/4081* (2013.01); *B60T 8/38* (2013.01)
USPC ............................................ 303/20; 188/152

(58) Field of Classification Search
CPC ... B60T 11/16; B60T 11/165; B60T 2270/82; B60T 13/66; B60T 13/68; B60T 13/686
USPC .............. 188/152; 303/14, 20, 115.1; 60/578, 60/585, 588, 589, 591
See application file for complete search history.

(56) References Cited

U.S. PATENT DOCUMENTS 3,635,028 A * 1/1972 Sherman .......................... 60/578
3,667,229 A * 6/1972 Cresto ............................. 60/578

(Continued)

FOREIGN PATENT DOCUMENTS

| DE | 1 195 185 | 6/1965 |
| DE | 42 40 518 A1 | 6/1994 |
| E | 102 35 288 A1 | 4/2003 |
| DE | 10 2007 049 620 A1 | 10/2008 |

(Continued)

OTHER PUBLICATIONS

International Search Report for PCT Application No. PCT/EP2011/054815 mailed Jun. 27, 2011.

*Primary Examiner* — Thomas J Williams
(74) *Attorney, Agent, or Firm* — RatnerPrestia

(57) ABSTRACT

A motor vehicle "brake-by-wire" system having an actuating unit, including a brake master cylinder, actuatable by a brake pedal, has a housing and a piston, arranged displaceably in the housing and, with the housing, delimits a pressure space. The brake master cylinder piston is a stepped piston with two differing size hydraulic active surfaces; a first, small active surface assigned to the pressure space, and a second, large active surface assigned to a filling space. In the "brake-by-wire" operating mode, the filling space is connected to the travel simulator via a pressure medium line such that, in the "brake-by-wire" operating mode, the first small active surface is effective, and, in the recoil plane after a closing travel has been overcome, the second, large hydraulic active surface is effective and the active surfaces are switched over depending on a hydraulic pressure in the pressure space and on the pedal force, respectively.

7 Claims, 2 Drawing Sheets

(56) References Cited

U.S. PATENT DOCUMENTS

| | | |
|---|---|---|
| 2002/0124563 A1 | 9/2002 | Ogiwara et al. |
| 2010/0181825 A1 | 7/2010 | Drumm et al. |
| 2012/0193975 A1* | 8/2012 | Ishii .............................. 303/14 |
| 2014/0008966 A1* | 1/2014 | Hotani et al. .................. 303/14 |

FOREIGN PATENT DOCUMENTS

| | | |
|---|---|---|
| EP | 1 878 630 A2 | 1/2008 |
| FR | 2 464 169 | 3/1981 |
| GB | 2 179 715 A | 3/1987 |
| WO | WO 01/72567 A1 | 10/2001 |

\* cited by examiner

US 8,876,223 B2

BRAKE SYSTEM FOR MOTOR VEHICLES

CROSS REFERENCE TO RELATED APPLICATIONS

This application is the U.S. National Phase Application of PCT/EP2011/054815, filed Mar. 29, 2011, which claims priority to German Patent Application Nos. 10 2010 003 380.4, filed Mar. 29, 2010 and 10 2010 003 689.7, filed Apr. 7, 2010, the contents of such applications being incorporated by reference herein.

FIELD OF THE INVENTION

The invention concerns a brake system for motor vehicles of the "brake-by-wire" type, with an actuator unit comprising a brake master cylinder which can be activated by means of a brake pedal, with a housing and a piston arranged displaceably in the housing, which together with the housing delimits a pressure chamber to which wheel brakes are connected, a pressureless pressurized medium storage reservoir, a hydraulically activatable travel simulator which cooperates with the brake master cylinder and comprises a simulator piston which is positioned by means of a spring and delimits firstly a simulator chamber receiving the spring and secondly a simulator chamber connected with the pressure chamber of the brake master cylinder, wherein the travel simulator, in particular in a "brake-by-wire" operating mode, gives the vehicle driver a pleasant pedal feel, wherein the brake master cylinder is activated purely by muscle power of the vehicle driver in a fall-back level, with an electrically controllable, pneumatic, electric or electrohydraulic pressure provision unit for pressurizing the wheel brakes, a pressure regulator valve assembly for regulation and/or control of a wheel brake pressure set at a wheel brake, and with an electronic control and regulating unit which controls or regulates the actuator unit and/or the pressure regulator valve assembly.

BACKGROUND OF THE INVENTION

"Brake-by-wire" brake systems are becoming increasingly common in automotive engineering. A generic electrohydraulic brake system for motor vehicles of the "brake-by-wire" type is known for example from DE 102 35 288 A1, which is incorporated by reference.

In "brake-by-wire" brake systems, the brake pressure necessary in service braking is provided without the direct involvement of the vehicle driver by the pneumatic, electric or electrohydraulic actuator unit. A so-called travel simulator gives the vehicle driver the pedal feel known from conventional brake systems.

On failure of the "brake-by-wire" unit or the electrics/electronics, the vehicle is braked by hydraulic pressure which the driver generates exclusively by muscle power in the hydraulic brake master cylinder (unamplified fall-back level). Furthermore, if the brake system switches to muscle-powered fall-back level e.g. due to failure of the external energy, the travel simulator must be isolated from the pedal actuation because the volume consumer "travel simulator" would otherwise lead to a substantially extended pedal travel and can lead to inadequate vehicle deceleration. For this reason, the system itself must be able to monitor the isolation of the simulator.

BRIEF DESCRIPTION OF THE INVENTION

The present invention is based on providing a brake system for motor vehicles of the "brake-by-wire" type which, in unamplified fall-back level, despite a travel simulator which cannot be isolated and despite the legal pedal force limitation of 500N, allows braking also of large and heavy vehicles with an ergonomically optimized pedal travel up to the legally prescribed full deceleration.

This is achieved according to an aspect of the invention in that the piston of the brake master cylinder is formed as a stepped piston with at least two hydraulic active surfaces of different sizes, wherein a first, small active surface is allocated to the pressure chamber and a second, large active surface is allocated to a filling chamber, and wherein the filling chamber in "brake-by-wire" operating mode is connected with the pressurized medium reservoir via a pressurized medium line so that the first, small active surface is active in the "brake-by-wire" operating mode, and the second, large, hydraulic active surface is active in the fall-back level after overcoming a closing travel, and switching of the active surfaces takes place depending on a hydraulic pressure in the pressure chamber or the pedal force.

In normal operation, i.e. in "brake-by-wire" operating mode, the piston step with a larger active surface is always connected with the pressurized medium reservoir and hence is inactive in normal operation of the brake system. This safety-relevant connection can be checked by the system for function suitability on each pedal activation.

In the fall-back level, this connection is interrupted and the brake master cylinder works with the larger active surface up to a constructively predetermined switching point. At the switching point, on reaching the switching pressure, the large active surface is again connected with the pressurized medium reservoir and further pressure build-up is continued only via the small active surface of the brake master cylinder.

Thus after overcoming the closing travel at the piston also present in normal operation ("brake-by-wire" operating mode), brake pressure is built up immediately and constantly in the wheel brake circuits. The activation force applied by the vehicle driver is used directly and without loss to build up pressure in the brake circuits.

BRIEF DESCRIPTION OF THE DRAWINGS

The invention is best understood from the following detailed description when read in connection with the accompanying drawing. Included in the drawing is the following figure.

The drawing shows diagrammatically.

DETAILED DESCRIPTION OF THE INVENTION

Figure 1:
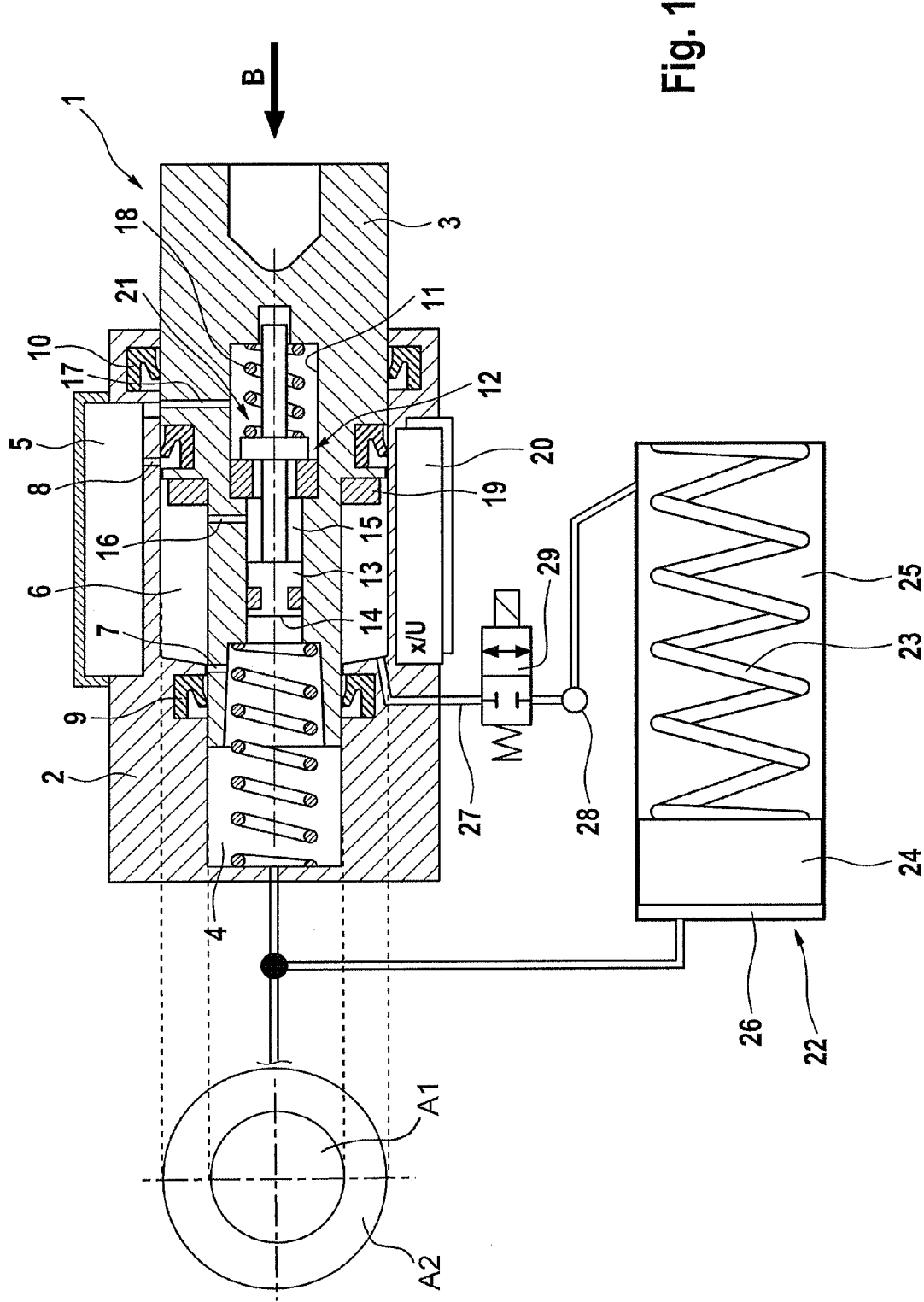
FIG. 1 an actuator unit of the embodiment example of a brake system according to the invention.

A brake system according to an aspect of the invention for motor vehicles of the "brake-by-wire" type comprises an actuator unit with a brake master cylinder 1 which can be activated by means of a brake pedal not shown, with a housing 2 and a piston 3 arranged displaceably in the housing 2, which together with the housing 2 delimits a pressure chamber 4. Wheel brakes not shown are connected to the brake master cylinder 1 or the pressure chamber 4 in the known manner.

Furthermore the actuator unit comprises a pressureless pressurized medium storage reservoir 5 and a hydraulically activatable travel simulator 22 which cooperates with the brake master cylinder 1 and, in particular in the "brake-by-wire" operating mode, gives the driver a pleasant pedal feel.

The travel simulator essentially comprises a simulator piston 24 which is positioned by means of a spring 23 and delimits firstly a simulator chamber 25 receiving the spring 23 and secondly a simulator chamber 26 connected with the pressure chamber 4 of the brake master cylinder 1.

An electronic control and regulating unit not shown controls or regulates a pneumatic, electric or electrohydraulic pressure provision unit to pressurize the wheel brakes, and a pressure regulator valve assembly to regulate and/or control the wheel brake pressure set at the wheel brakes.

The fundamental function and construction of a brake system for motor vehicles of the "brake-by-wire" type are known so that no more detailed description is required. Therefore only the features essential to the invention are described below.

On failure of the "brake-by-wire" unit or the electrics/electronics, the vehicle is braked by hydraulic pressure which the driver generates exclusively by muscle power in the hydraulic brake master cylinder 1 (unamplified fall-back level). Furthermore, if the brake system switches to muscle-powered fall-back level e.g. due to failure of the external energy, the travel simulator 22 must be isolated from the pedal actuation because the volume consumer "travel simulator" 22 would otherwise lead to a substantially extended pedal travel and can lead to inadequate vehicle deceleration. For this reason, the system itself must be able to monitor the isolation of the travel simulator 22.

The present invention is therefore based on providing a brake system for motor vehicles of the "brake-by-wire" type which, in unamplified fall-back level, despite a travel simulator which cannot be isolated and despite the legal pedal force limitation of 500N, allows braking also of large and heavy vehicles with an ergonomically optimized pedal travel up to the legally prescribed full deceleration.

The piston 3 of the brake master cylinder 1 according to the invention is therefore formed as a stepped piston with at least two hydraulic active surfaces A1, A2 of different sizes. A first, small active surface A1 is allocated to the pressure chamber 4 and a second, large active surface A2 is allocated to a filling chamber 6.

In the context of the invention it is conceivable to provide three or more steps on the piston 3 so that three or more hydraulic active surfaces A1, A2, A3 to An of different sizes are formed, which are connected in succession in the manner of a register.

In the "brake-by-wire" operating mode furthermore, the filling chamber 6 is connected with the pressurized medium reservoir 5 via a pressurized medium line 27 and a reservoir connection 28.

As evident from FIG. 1, the pressurized medium line 27 in the "brake-by-wire" operating mode is provided closeable by means of a valve 29, which for example is formed as an electromagnetically activatable, normally closed (NC) 2/2 way valve. In unamplified fall-back level, the valve 29 therefore closes the pressurized medium line 27 between the filling chamber 6 and the pressurized medium reservoir 5.

In normal operation, i.e. in "brake-by-wire" operating mode, the piston step with a larger active surface A2 is always connected with the pressurized medium reservoir 5 and hence is inactive in normal operation of the brake system, so that, in the "brake-by-wire" operating mode, only the first, small active surface A1 is active. This safety-relevant connection can be checked by the system for function suitability on each pedal activation.

In the fall-back level, this connection is interrupted and the brake master cylinder 1 works with the larger active surface A2 up to a constructively predetermined switching point. At the switching point, on reaching the switching pressure, the large active surface A2 is again connected with the pressurized medium reservoir 5 and further pressure build-up is continued only via the smaller active surface A1.

FIG. 1 shows the brake master cylinder 1 in an unactivated position in the fall-back level in which the valve 29 is closed. Both chambers 4, 6 are connected with the pressureless pressurized medium reservoir 5. As evident in FIG. 1, the piston 3 in a region of the first, small active surface A1 has one (or more) first connecting bore 7 which connects the pressure chamber 4 with the filling chamber 6 in the unactivated position. At the same time the filling chamber 6 is connected with the pressurized medium reservoir 5 via a connecting line 8. If the piston 3 is moved in activation direction B via activation of the brake pedal, the connecting bores 7 and the connecting line 8 are interrupted by the bypassing of sealing sleeves 9, 10, and a hydraulic pressure can be built up in the pressure chamber 4. After overcoming a closing travel therefore the second, large, hydraulic active surface A2 is active. Thus the brake system is filled over a short pedal travel and a vehicle deceleration of around 0.3 g can be achieved, and the activation force applied by the vehicle driver is used directly and without loss to build up pressure in the brake circuits.

The switching of the active surfaces from A2 to A1 takes place depending on a hydraulic pressure in the pressure chamber 4 or the pedal force.

For this, a valve assembly 21 is provided which is arranged in a central bore 11 of the piston 3. The valve assembly 21, as evident from FIG. 1, comprises a central valve 12 with a switching piston 13, wherein the switching piston 13 on its end face 14 is exposed to the pressure of the pressure chamber 4. Furthermore the switching piston 13 delimits a switching chamber 15 which is connected with the filling chamber 6 via a second connecting bore 16 formed in the piston 3.

If the switching piston 13 is moved by the pressure in the pressure chamber 4 against the pressure of a switching spring 18 against the activation direction B, to the left in the drawing, the central valve 12 opens and connects the switching chamber 15 with the pressurized medium reservoir 5 via a third connecting bore 17 formed in the piston 3, so that only the first, small, hydraulic active surface A1 of the piston 3 is still active.

After reaching a vehicle deceleration of around 0.3 g, the active surface of the brake master cylinder 1 is then switched to the smaller active surface A1. This allows the vehicle driver, via the small active surface A1 of the piston 3, to achieve braking with the legally permitted pedal force of 500N up to the blocking limit, depending on the brake system and mass of the vehicle. The pedal travel can here be kept in the ergonomically optimum range up to 100 mm.

Thus after overcoming the closing travel at the piston 3, brake pressure is immediately and constantly built up in the wheel brake circuits. The activation force applied by the vehicle driver is used directly and without loss to build up pressure in the brake circuits.

If three or more active surfaces A1 to An are provided at the piston 3, it is conceivable to arrange the valve assemblies also in bores produced parallel to the central bore 11, each connected to the smallest pressure chamber 4 and to the pressurized medium reservoir 5.

To detect the activation travel of the brake master cylinder 1, a sensor device is proposed to detect movement and position of the piston 3, which device can be connected with the electronic control and regulating unit. As evident from FIG. 1, on the piston 3 is arranged a signal emitter 19, for example in the form of a magnet, and a sensor element 20 is attached stationary to the housing 2. Using the sensor device it is possible to sense the travel of the piston 3 and detect the driver's wish or generate a nominal value.

Advantageously the pressurized medium reservoir 5 can be provided integrated in the housing 2 of the brake master cylinder 1.

Figure 2:
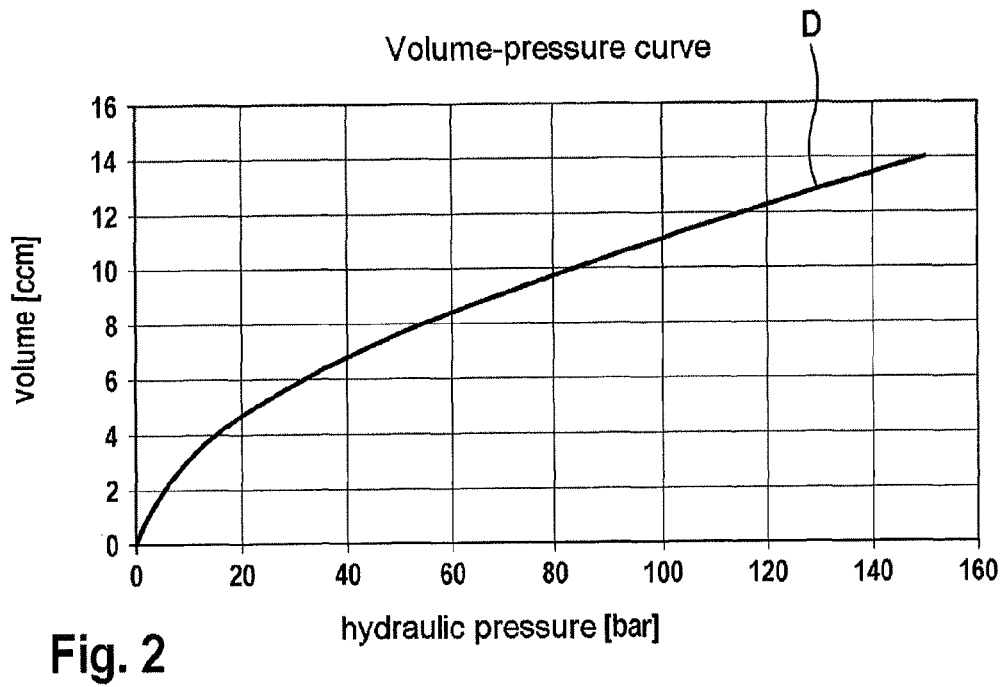
FIG. 2 an example depiction of a volume-pressure curve of the brake system according to the invention.

FIG. 2 shows an example depiction of a volume-pressure curve D of the brake system according to the invention.

Figure 3:
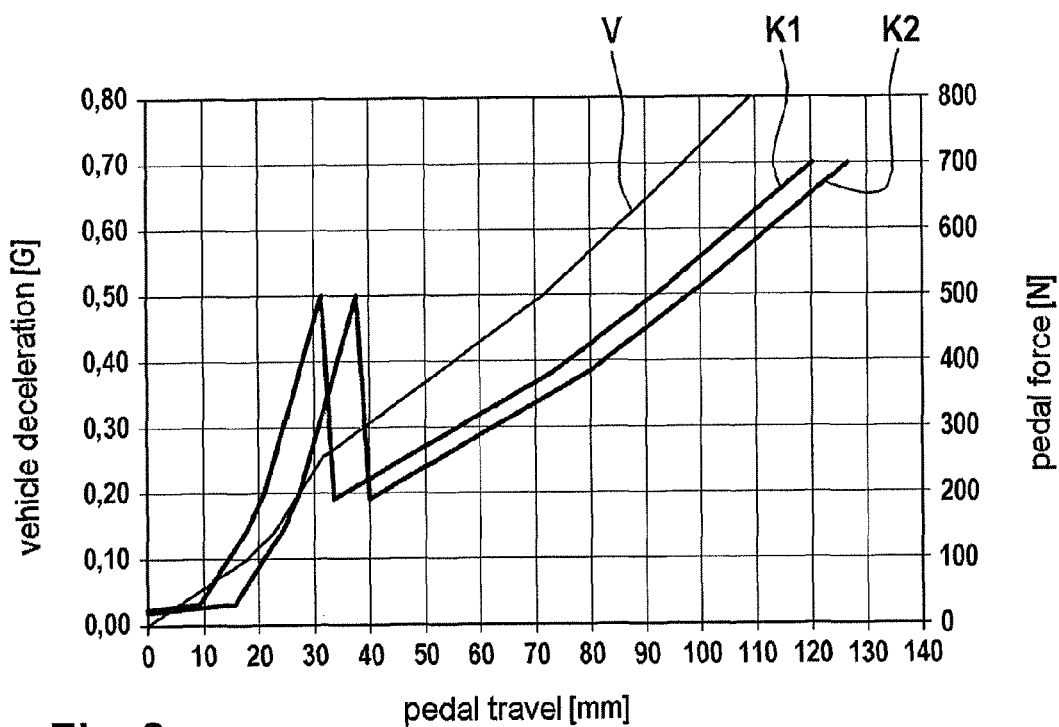
FIG. 3 an example depiction of a pedal travel-pedal force curve and a pedal travel-vehicle deceleration curve in the fall-back level of the brake system according to the invention.

FIG. 3 furthermore shows an example depiction of a pedal travel-pedal force curve K and a pedal travel-vehicle deceleration curve V in the fall-back level of the brake system according to the invention. Curve K1 shows the pedal characteristic without travel simulator 22, and curve K2 shows the pedal characteristic with travel simulator 22.

LIST OF REFERENCE NUMERALS

1 Brake master cylinder
2 Housing
3 Piston
4 Pressure chamber
5 Pressurized medium reservoir
6 Filling chamber
7 Connecting bore
8 Connecting line
9 Sealing sleeve
10 Sealing sleeve
11 Central bore
12 Central valve
13 Switching piston
14 End face
15 Switching chamber
16 Connecting bore
17 Connecting bore
18 Switching spring
19 Signal emitter
20 Sensor element
21 Valve assembly
22 Travel simulator
23 Spring
24 Simulator piston
25 Simulator chamber
26 Simulator chamber
27 Pressurized medium line
28 Reservoir connection
29 Valve
B Activation direction
D Volume-pressure curve
K Pedal travel-pedal force curve
V Pedal travel-vehicle deceleration curve

The invention claimed is:

1. A brake-by-wire system for motor vehicles with an actuator unit comprising:
a brake master cylinder which can be activated by a brake pedal, with a housing and a piston arranged displaceably in the housing, which together with the housing delimits a pressure chamber to which wheel brakes are connected,
a pressureless pressurized medium storage reservoir,
a hydraulically activatable travel simulator which cooperates with the brake master cylinder and comprises a simulator piston which is positioned by means of a spring and delimits firstly a simulator chamber receiving the spring and secondly a simulator chamber connected with the pressure chamber of the brake master cylinder,
wherein the travel simulator, in a "brake-by-wire" operating mode, gives the vehicle driver a pleasant pedal feel, wherein the brake master cylinder is activated purely by muscle power of the vehicle driver in a fall-back level,
with an electrically controllable, pneumatic, electric or electrohydraulic pressure provision unit for pressurizing the wheel brakes, a pressure regulator valve assembly for regulation and/or control of a wheel brake pressure set at a wheel brake,
and with an electronic control and regulating unit which controls or regulates the actuator unit and/or the pressure regulator valve assembly,
wherein the piston of the brake master cylinder is formed as a stepped piston with at least two hydraulic active surfaces of different sizes, wherein a first, small active surface is allocated to the pressure chamber and a second, large active surface is allocated to a filling chamber, and wherein the filling chamber in the "brake-by-wire" operating mode is connected with the pressureless pressurized medium reservoir via a pressurized medium line so that the first, small active surface is active in the "brake-by-wire" operating mode, and the second, large, hydraulic active surface is active in the fall-back level after overcoming a closing travel, and switching of the active surfaces takes place depending on a hydraulic pressure in the pressure chamber or the pedal force.

2. The brake system as claimed in claim 1, wherein the pressurized medium line is provided closeable between the filling chamber and the pressureless pressurized medium reservoir.

3. The brake system as claimed in claim 2, wherein to close the pressurized medium line in the "brake-by-wire" operating mode, a valve is arranged in the pressurized medium line.

4. The brake system as claimed in claim 1, wherein the switching of the active surfaces in the fall-back level takes place by a valve assembly.

5. The brake system as claimed in claim 4, wherein the valve assembly comprises a central valve arranged in a central bore of the piston with a switching piston, wherein the switching piston is exposed to the pressure of the pressure chamber and delimits a switching chamber which is connected with the filling chamber and in an open position of the central valve is connected with the pressureless pressurized medium reservoir.

6. The brake system as claimed in claim 5, wherein the brake master cylinder comprises a sensor device to detect movement and position of the piston, wherein a signal emitter is arranged on the piston, and a sensor element is attached to the housing.

7. The brake system as claimed in claim 1, wherein the pressureless pressurized medium reservoir is provided integrated in the housing of the brake master cylinder.

* * * * *